US012783175B2

(12) United States Patent
Chugh et al.

(10) Patent No.: US 12,783,175 B2
(45) Date of Patent: Nov. 3, 2026

(54) PREPARING A DATA STORAGE DEVICE FOR A SUBSEQUENT USER SESSION

(71) Applicant: Sandisk Technologies, Inc., Milpitas, CA (US)

(72) Inventors: Abhinandan Chugh, Bangalore (IN); Nitin Jain, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/058,195

(22) Filed: Feb. 20, 2025

(65) Prior Publication Data

US 2026/0244362 A1 Aug. 20, 2026

(51) Int. Cl.
*G06F 3/00* (2006.01)
*G06F 3/06* (2006.01)

(52) U.S. Cl.
CPC .......... *G06F 3/0659* (2013.01); *G06F 3/0625* (2013.01); *G06F 3/0647* (2013.01); *G06F 3/0679* (2013.01)

(58) Field of Classification Search
CPC .... G06F 3/0659; G06F 3/0625; G06F 3/0647; G06F 3/0679
See application file for complete search history.

(56) References Cited

U.S. PATENT DOCUMENTS 10,229,049 B2 3/2019 Hashimoto
11,893,258 B2 2/2024 Kabra
11,995,342 B2 5/2024 Bi
2012/0159051 A1* 6/2012 Hida .................. G06F 12/0246 711/E12.008
2014/0089584 A1* 3/2014 Pan ...................... G06F 3/0689 711/E12.017
2014/0351527 A1* 11/2014 Traut .................... G06F 3/0659 711/154
2016/0077968 A1* 3/2016 Sela .................... G06F 12/0246 711/118
2019/0236029 A1* 8/2019 Butcher .............. G06F 12/0246
2019/0250845 A1* 8/2019 Kabra ................. G06F 13/1673
2020/0319815 A1 10/2020 Dutta
2021/0289027 A1* 9/2021 Smith ................... G06F 3/0607
2022/0229566 A1* 7/2022 Benisty ................. G06F 3/0653
2024/0168895 A1 5/2024 Tanpairoj

* cited by examiner

*Primary Examiner* — Craig S Goldschmidt
(74) *Attorney, Agent, or Firm* — Arlene P. Neal; NEAL BLIBO LLC

(57) ABSTRACT

A storage device may ensure burst pool performance for subsequent host data operations after data is written to a burst pool. The storage device includes a memory device with a burst pool and non-burst pool. The burst pool stores fewer bits per memory cell than the non-burst pool. A controller in the storage device may receive a burst pool indication from a host. The controller may receive a host data operation command from the host and write the host data in the burst pool. The controller may extend an idle timer that is triggered after the host data operation is complete. The controller may relocate data from the burst pool to the non-burst pool during an extended idle time, wherein relocation clears the burst pool.

20 Claims, 6 Drawing Sheets

PREPARING A DATA STORAGE DEVICE FOR A SUBSEQUENT USER SESSION

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. Data may be stored in the blocks in various formats, with the formats being defined by the number of bits that may be stored per memory cell. For example, a single-level cell (SLC) format may write one bit per memory cell, a multi-level cell (MLC) format may write two bits per memory cell, a triple-level cell (TLC) format may write three bits per memory cell, a quadruple-level cell (QLC) format may write four bits per memory cell, and so on. A format used to store fewer bits per memory cell may be accessed faster than a format used to store more bits per memory cell.

The memory device may include a burst pool (i.e., a group of blocks where data is stored in fewer bits per memory cell). For example, the burst pool may primarily include SLC blocks. The burst pool may be used to achieve higher read/write performance during an initial phase of host read/write operations. When the burst pool is filled, a controller on the storage device may relocate data from the burst pool to relatively slower storage (i.e., blocks on the memory device that may store more bits per cell than the blocks in the burst pool). For example, the controller may move data from a burst pool with SLC blocks to MLC or TLC blocks.

The host may supply power to the storage device and the storage device may enter a low power mode when it is not executing host operations. As the storage device may only be suppled power when the storage device is executing host instructions, the controller may interleave background operations, including relocation of data from the burst pool to relatively slower storage, with the host instructions. As such, relocation from the burst pool may impact host write performance. When the host stops sending data operation commands, the controller may abort any ongoing relocation operations associated with freeing up space in the burst pool as the storage device enters the low power mode. When all of data in the burst pool is not relocated and the host issues a subsequent write command, the data may be written to the remaining section of the burst pool and, if more space is needed, to the relatively slower storage. While the controller is writing the data in the subsequent command, the controller may also relocate data from the burst pool, possibly preventing the storage device from providing burst pool performance for the subsequent command.

Consider an example where the capacity of the burst pool is five gigabytes (GB) and the host issues a first command to store a three GB video. The controller may store the video in the burst pool. The controller may determine that a relocation threshold that may be kept close to the burst pool capacity is not met, and the controller may not begin relocating data from the burst pool. It should be noted that the relocation threshold may be kept close to the burst pool capacity to prevent early relocation from the burst pool that may impact the performance associated with using the burst pool. If the host issues a second command to store a second three GB video, the controller may store two GB from the second video in the burst pool and the remaining one GB in a relatively slower memory. While the controller is storing the remaining one GB in the slower memory, the controller may begin relocation from the burst pool, possibly lowering the storage device performance.

Due to the controller having to interleave writing host data with relocation from the burst pool, the controller may not have sufficient time to relocate the entire burst pool while it is processing host commands. As such, once the burst pool is filled, the storage device may have to interleave writing host data with relocation from the burst pool for subsequent host commands. Some current approaches may use varying ratios to interleave the host operations with relocation operations from the burst pool so that there may be minimal impact on host operations and maximum use of the burst pool. In some approaches, the controller may perform relocation operations from the burst pool during an idle time (i.e., a period after the controller completes the host command before entering a low power mode). However, the idle time periods may be insufficient to relocate all of the data from the burst pool.

SUMMARY OF THE INVENTION

In some implementations, a storage device may ensure burst pool performance for subsequent host data operations after data is written to a burst pool. The storage device includes a memory device with a burst pool and non-burst pool. The burst pool stores fewer bits per memory cell than the non-burst pool. A controller in the storage device may receive a burst pool indication from a host. The controller may receive a host data operation command from the host and write the host data in the burst pool. The controller may extend an idle timer that is triggered after the host data operation is complete. The controller may relocate data from the burst pool to the non-burst pool during an extended idle time, wherein relocation clears the burst pool.

In some implementations, a storage device may ensure burst pool performance for subsequent host data operations after data is written to a burst pool. The storage device includes a memory device with a burst pool and non-burst pool. The burst pool stores fewer bits per memory cell than the non-burst pool. A controller in the storage device may receive a host data operation command from a host and write host data in the burst pool. The controller may prompt the host for a burst pool indication and receive the burst pool indication from the host. The controller may extend an idle timer that is triggered after a host data operation is complete. The controller may relocate data from the burst pool to the non-burst pool during an extended idle time, wherein relocation clears the burst pool.

In some implementations, a method is provided on the storage device for ensuring burst pool performance for subsequent host data operations after data is written to a burst pool. The method includes receiving a host data operation command from a host and writing host data in the burst pool. The method also includes receiving a burst pool indication from the host and extending an idle timer that is triggered after a host data operation is complete. The method further includes relocating data from the burst pool to the non-burst pool during an extended idle time, wherein relocation clears the burst pool.

Figure 1:
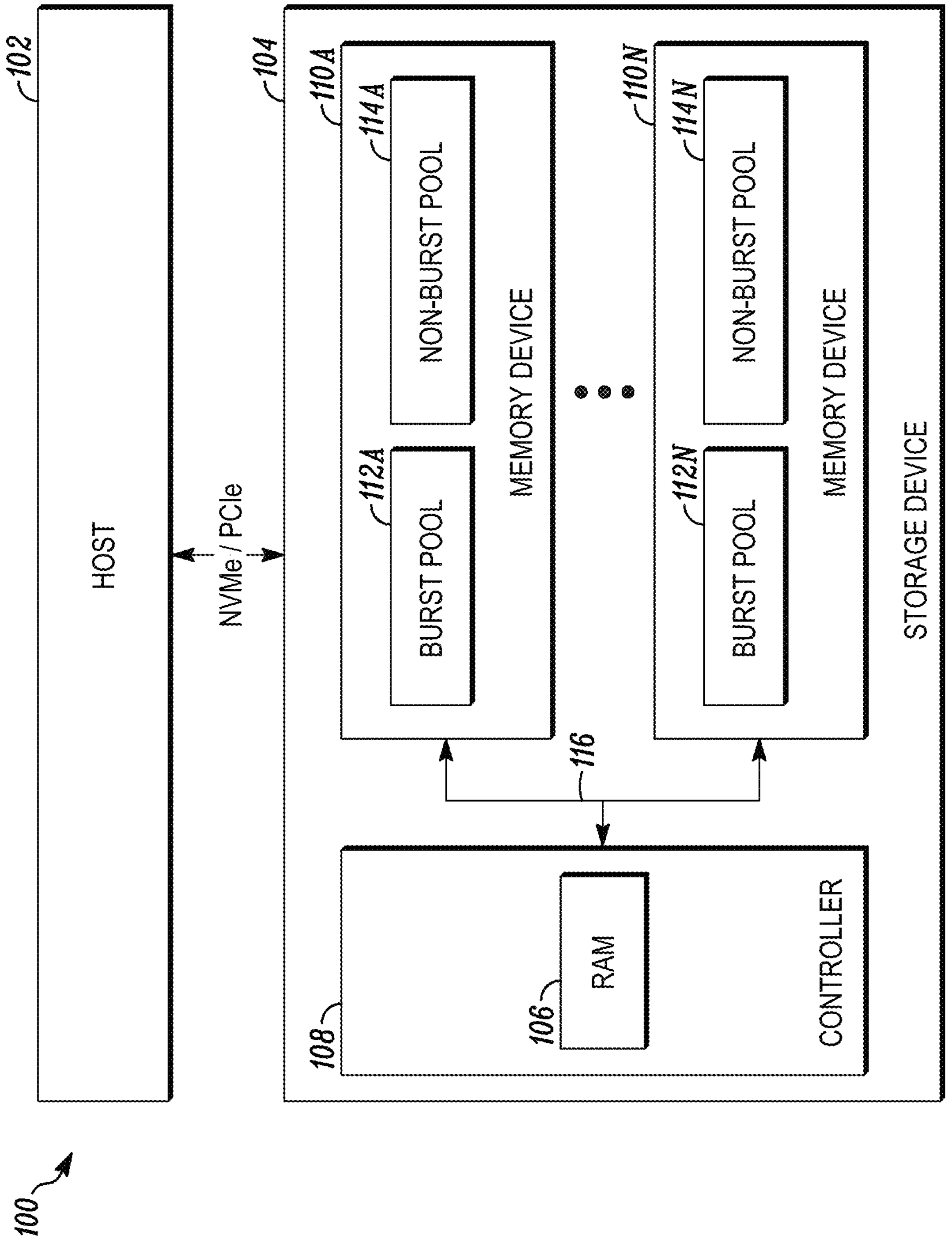
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may include a random-access memory (RAM) 106, a controller 108, and one or more non-volatile memory devices **110*a*-110*n* (referred to herein as the memory device(s) 110). Storage device 104 may be, for example, a solid-state drive (SSD). RAM 106 may be, for example, static RAM (SRAM) or dynamic RAM (DRAM) that be used to temporarily store data on storage device 104**.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include one or more dies connected to a memory bus 116 including data lines and chip enable lines. The dies may be divided into blocks and data may be stored in the blocks in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per memory cell, and so on. Memory device 110 may be included in storage device 104 or may be otherwise communicatively coupled to storage device 104.

Memory device 110 may include a burst pool **112*a*-112*n* (referred to herein as burst pool(s) 112) that may include a group of blocks where data is stored using fewer bits per memory cell. Memory device 110 may also include a non-burst section 114*a*-114*n* (referred to herein as non-burst pool(s) 114) that may include a group of blocks where data is stored in a format used to store more bits per memory cell than the format used on the blocks in burst pools 112. In one example, burst pool 112 may primarily include SLC blocks and may be used to achieve higher read/write performance during host read/write operations. Non-burst pool 114** may include MLC, TLC, and/or QLC blocks.

To ensure that burst pool 112 is continuously available for host data operations and that host 102 receives maximum burst performance for write sessions (also referred to herein as subsequent write session/subsequent host data operations) that are initiated after data is written in burst pool 112, storage device 104 may enable host 102 to trigger clearing of burst pool 112. In one implementation, when storage device 104 is initialized, host 102 may provide a burst pool indication for storage device 104 to prepare burst pool 112 for subsequent host data operations. Host 102 may automatically revoke and/or resend the burst pool indication at any time after initialization.

In an implementation, after storage device 104 is initialized and prior to processing an initial host data operation, controller 108 may determine that storage device has not received the burst pool indication. Controller 108 may determine if host 102 wants storage device 104 to prepare burst pool 112 for subsequent host data operations. For example, controller 108 may prompt host 102 to provide the burst pool indication. Host 102 may prompt a user for the burst pool indication. For example, host 102 may prompt the user to select an option associated with the burst pool indication from an application running on host 102. Host 102 may allow the user to deselect or reselect the option associated with the burst pool indication at a later time. In another example, host 102 may automatically generate the burst pool indication and host 102 may automatically revoke or resend the burst pool indication at any time.

When storage device 104 receives the burst pool indication from host 102, after controller writes the data from the initial host data operation into burst pool 112, controller 108 may calculate the time needed to relocate the data currently in burst pool 112. Controller 108 may extend or override an idle timer that may be triggered after the host data operation is complete, wherein the idle timer may cover the calculated time needed to relocate the data currently in burst pool 112. The idle timer may be associated with a period after controller 108 completes a host data operation before entering a low power mode When the idle timer expires, host 102 may reduce or stop sending power to storage device 104 and storage device 104 may enter a low power mode.

During the extended idle time period, controller 108 may relocate data from burst pool 112 to non-burst pool 114 and completely clear the space in burst pool 112. Storage device 104 may notify host 102 when burst pool 112 has been cleared. The notification may be used to indicate that storage device 104 is prepared to provide maximum burst performance for an upcoming/subsequent host data operation. By obtaining approval to extend the idle time from host 102 via the burst pool indication, storage device may not violate current low power mode specifications.

In an implementation, if controller 108 has not received the burst pool indication from host 102, after controller 108 receives an initial host data operation command and completes the initial host data operation (i.e., after controller 108 completes writing data associated with the initial host data operation into burst pool 112 and before entering the low power mode), controller 108 may calculate the time needed to relocate the data currently in burst pool 112. Storage device 104 may prompt host 102 using, for example, an Asynchronous Event Notification (AEN). The AEN may include the time needed to relocate the data currently in burst pool 112 and the AEN may be used to request the burst pool indication from host 102. In cases where storage device 104 is not preconfigured during, for example, initialization or at any point after initialization, to relocate the data from burst pool 112 after host data operations, the AEN may provide host 102 an option to prompt a user for the burst pool indication.

If storage device 104 receives the burst pool indication from host 102, controller 108 may perform burst pool 112 cleanup operations (i.e. controller 108 may extend the idle timer and relocate the data in burst pool 112 to non-burst pool 114 during the idle time). When burst pool 112 cleanup operations is complete, storage device 104 may notify host 102 of the completion and enter a low power state. Host 102 may disconnect power to storage device 104. If, after storage device sends the AEN with the time needed to relocate the data currently in burst pool 112, host 102 does not send the burst pool indication, storage device may enter the low power state and host 102 may disconnect power to storage device 104.

Consider an example where host 102 is used by an adventure provider to capture videos of customers performing an activity. For example, host 102 may be used by a paragliding provider to capture brief videos while customers are paragliding. If host 102 did not provide the burst pool indication to storage device 104, after controller 108 performs the initial host data operation and completes storing a first customer video in burst pool 112, controller 108 may calculate the time needed to relocate the data currently in burst pool 112 before entering the low power mode. Storage device 104 may prompt host 102 with the time needed to relocate the data currently in burst pool 112 and request the burst pool indication from host 102. If host 102 does not provide the burst pool indication to storage device 104 to ensure burst pool performance for subsequent host data operations associated with storing upcoming videos on memory device 110, host 102 may have to manually intervene each time a video is being stored on memory device 110 to ensure that burst pool 112 is cleared and ready to receive an upcoming/subsequent video. For example, host 102 may move data recorded on memory device 110 to another device to prepare storage device 104 for the upcoming/subsequent video.

On the other hand, host 102 may use the burst pool indication to ensure that burst pool 112 is automatically cleaned prior to starting the next customer video. If host 102 provides the burst pool indication to storage device 104, storage device 104 may automatically relocate the data in burst pool 112 to non-burst pool 114 (i.e., controller 108 may extend the idle timer and relocate the data in burst pool 112 to non-burst pool 114 during the idle time). When storage device 104 completes the burst pool cleanup, storage device 104 may send a confirmation of the burst pool cleanup to host 102. Host 102 may use the confirmation as an indication that storage device 104 is ready to provide burst pool performance for the next customer video. The confirmation may thus be used to ensure that the user does not begin the next customer video too early (i.e., host 102 may not begin a subsequent host data operation on storage device 104 before the burst pool cleanup is complete). By allowing storage device 104 to automatically clean burst pool 112, host 102 may achieve burst pool performance for upcoming/subsequent customer videos and avoid glitches in recording upcoming customer activities.

Storage device 104 may provide burst pool performance for subsequent host data operations at the cost of host power. If host 102 is not connected to, for example, continuous power or to a high-power battery, host 102 may choose to ignore prompts for the burst pool indication from storage device 104 and host may not trigger complete burst pool cleanup for subsequent host data operations. If host 102 is connected to a continuous power source or a high-power battery, the power cost from host 102 may be low. In this case, when host 102 has continuous power, host 102 may choose to provide the burst pool indication to storage device 104 and trigger complete burst pool cleanup for subsequent host data operations. Storage device 104 may thus provide host 102 the flexibility in choosing burst pool performance for subsequent host data operations.

Storage device 104 may perform these processes based on a processor, for example, controller 108 executing software instructions stored by a non-transitory computer-readable medium, such as memory device 110 (also generally referred to herein as storage component 110). As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
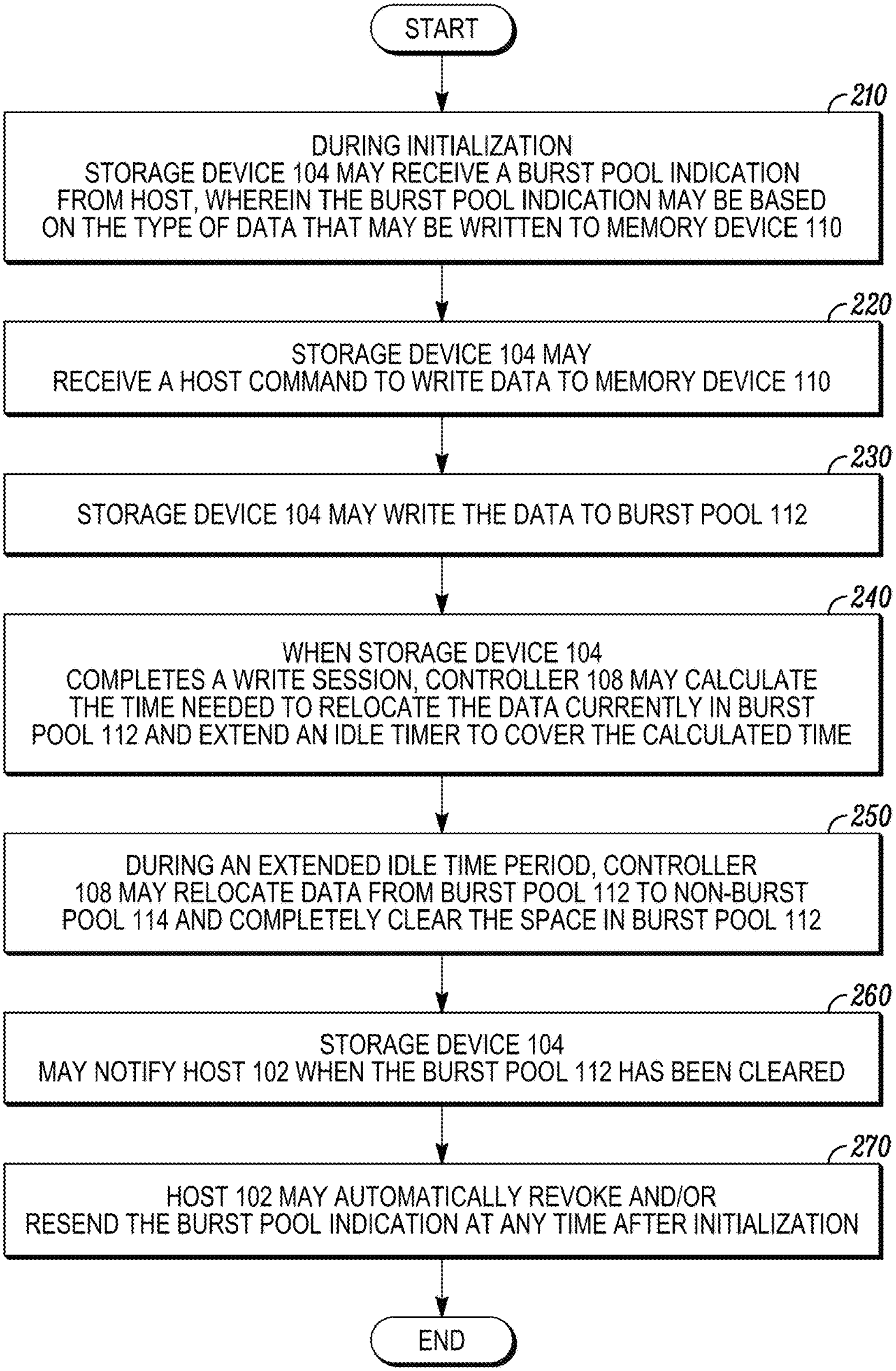
FIG. 2 is an example flow diagram for ensuring burst pool performance for host data operations on a storage device in accordance with some implementations.

FIG. 2 is an example flow diagram for ensuring burst pool performance for host data operations on a storage device in accordance with some implementations. At 210, during initialization storage device 104 may receive a burst pool indication from host, wherein the burst pool indication may be based on the type of data that may be written to memory device 110. At 220, storage device 104 may receive a host command to write data to memory device 110. At 230, storage device 104 may write the data to burst pool 112. At 240, when storage device 104 completes a write session or set of write commands, controller 108 may calculate the time needed to relocate the data currently in burst pool 112 and extend an idle timer to cover the calculated time. At 250, during an extended idle time period, controller 108 may relocate data from burst pool 112 to non-burst pool 114 and completely clear the space in burst pool 112. At 260, storage device 104 may notify host 102 when the burst pool 112 has been cleared. At 270, host 102 may automatically revoke and/or resend the burst pool indication at any time after initialization. As indicated above FIG. 2 is provided as an example. Other examples may differ from what is described in FIG. 2.

Figure 3:
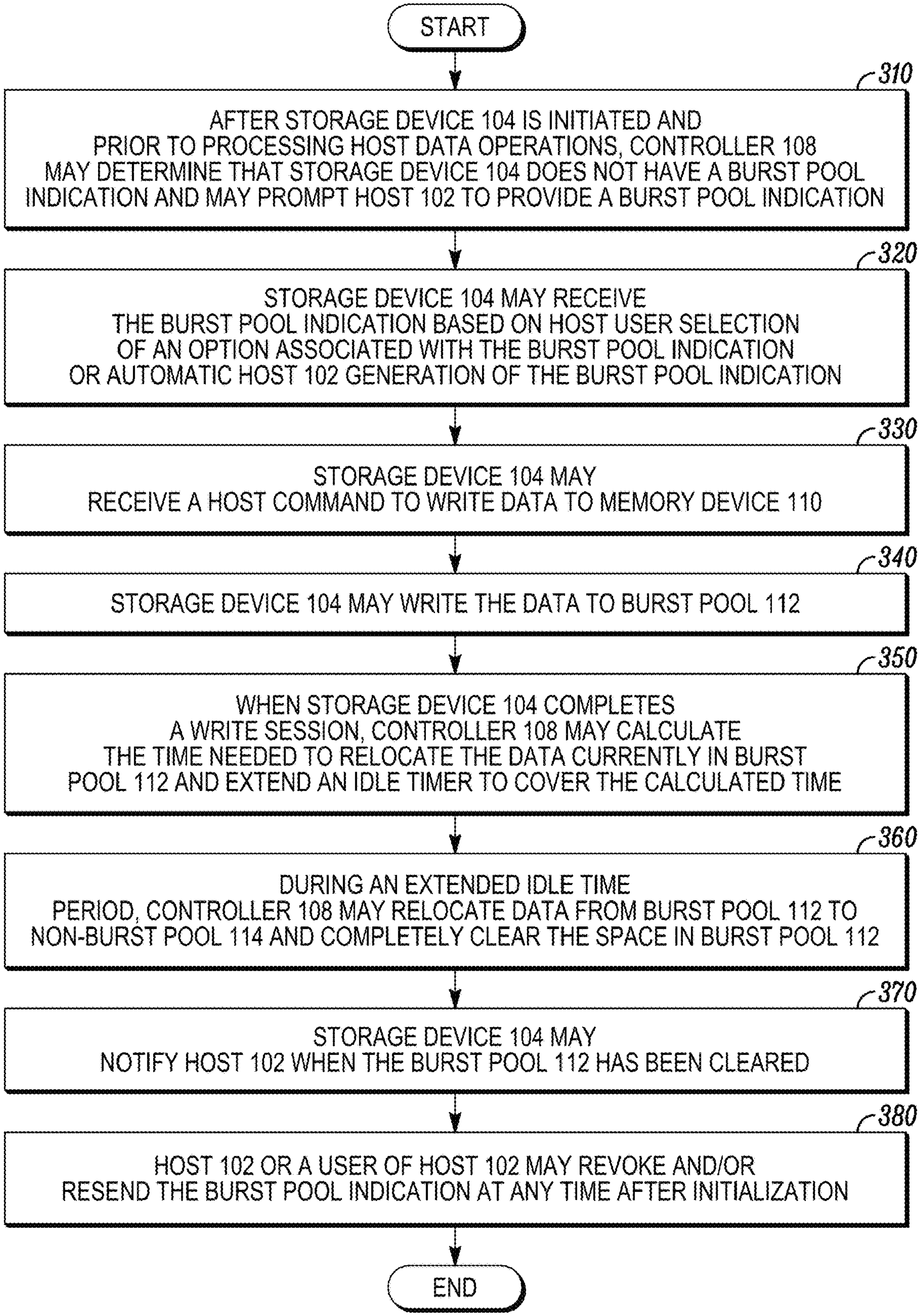
FIG. 3 is another example flow diagram for ensuring burst pool performance for host data operations on a storage device in accordance with some implementations.

FIG. 3 is another example flow diagram for ensuring burst pool performance for host data operations on a storage device in accordance with some implementations. At 310, after storage device 104 is initiated and prior to processing host data operations, controller 108 may determine that storage device 104 does not have a burst pool indication and may prompt host 102 to provide the burst pool indication. At 320, storage device 104 may receive the burst pool indication based on host user selection of an option associated with the burst pool indication or automatic host 102 generation of the burst pool indication. At 330, storage device 104 may receive a host command to write data to memory device 110. At 340, storage device 104 may write the data to burst pool 112. At 350, when storage device 104 completes a write session, controller 108 may calculate the time needed to relocate the data currently in burst pool 112 and extend an idle timer to cover the calculated time. At 360, during an extended idle time period, controller 108 may relocate data from burst pool 112 to non-burst pool 114 and completely clear the space in burst pool 112. At 370, storage device 104 may notify host 102 when the burst pool 112 has been cleared. At 270, host 102 or a user of host 102 may revoke and/or resend the burst pool indication at any time after initialization. As indicated above FIG. 3 is provided as an example. Other examples may differ from what is described in FIG. 3.

Figure 4:
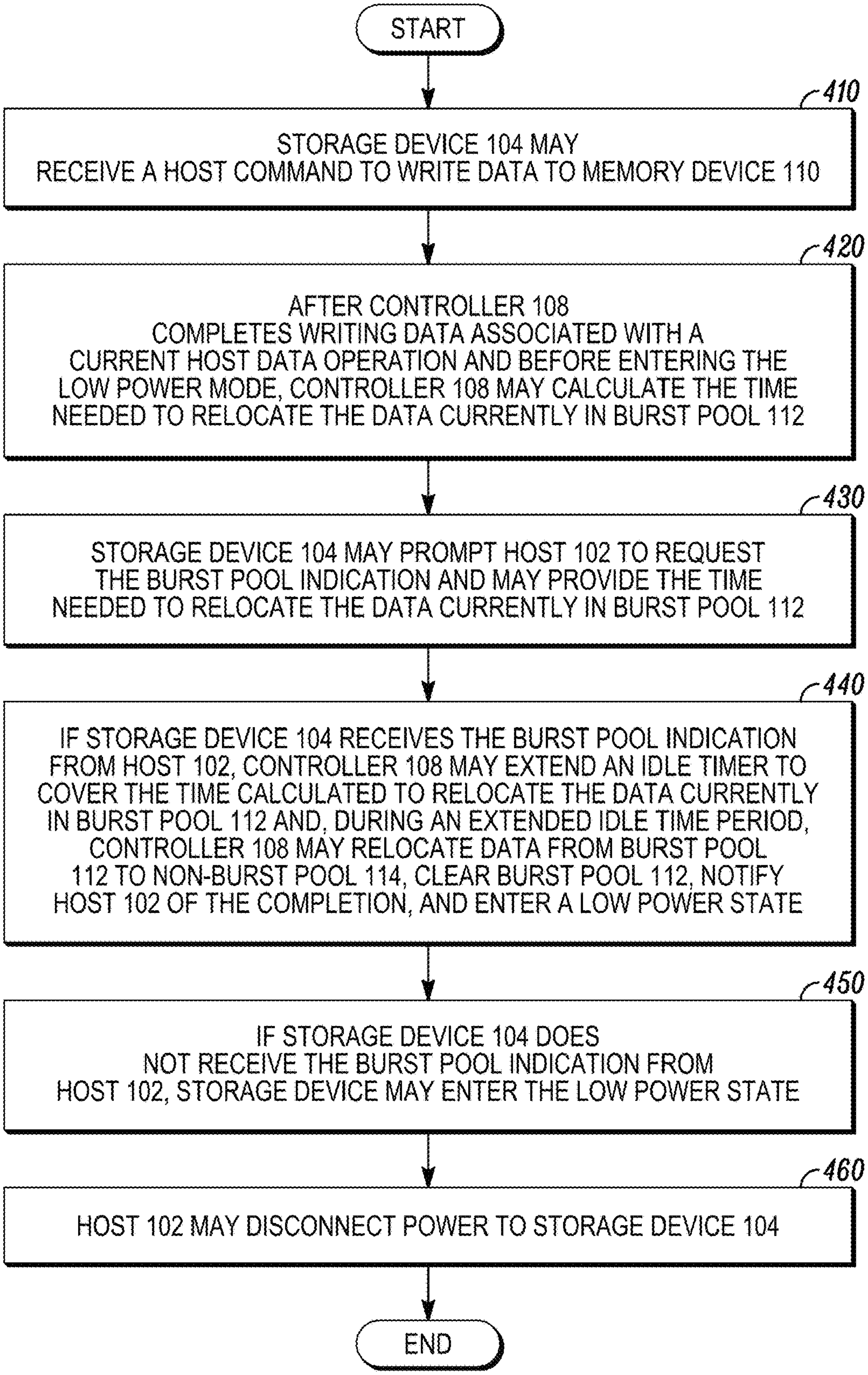
FIG. 4 is another example flow diagram for ensuring burst pool performance for host data operations on a storage device in accordance with some implementations.

FIG. 4 is another example flow diagram for ensuring burst pool performance for host data operations on a storage device in accordance with some implementations. At 410, storage device 104 may receive a host command to write data to memory device 110. At 420, after controller 108 completes writing data associated with a current host data operation and before entering the low power mode, controller 108 may determine that storage device 104 does not have a burst pool indication and may calculate the time needed to relocate the data currently in burst pool 112. At 430, storage device 104 may prompt host 102 to request the burst pool indication and may provide the time needed to relocate the data currently in burst pool 112. At 440, if storage device 104 receives the burst pool indication from host 102, controller 108 may extend an idle timer to cover the time calculated to relocate the data currently in burst pool 112 and, during an extended idle time period, controller 108 may relocate data from burst pool 112 to non-burst pool 114, clear burst pool 112, notify host 102 of the completion, and enter a low power state. At 450, if storage device 104 does not receive the burst pool indication from host 102, storage device may enter the low power state. At 460, host 102 may disconnect power to storage device 104. As indicated above FIG. 4 is provided as an example. Other examples may differ from what is described in FIG. 4.

Figure 5:
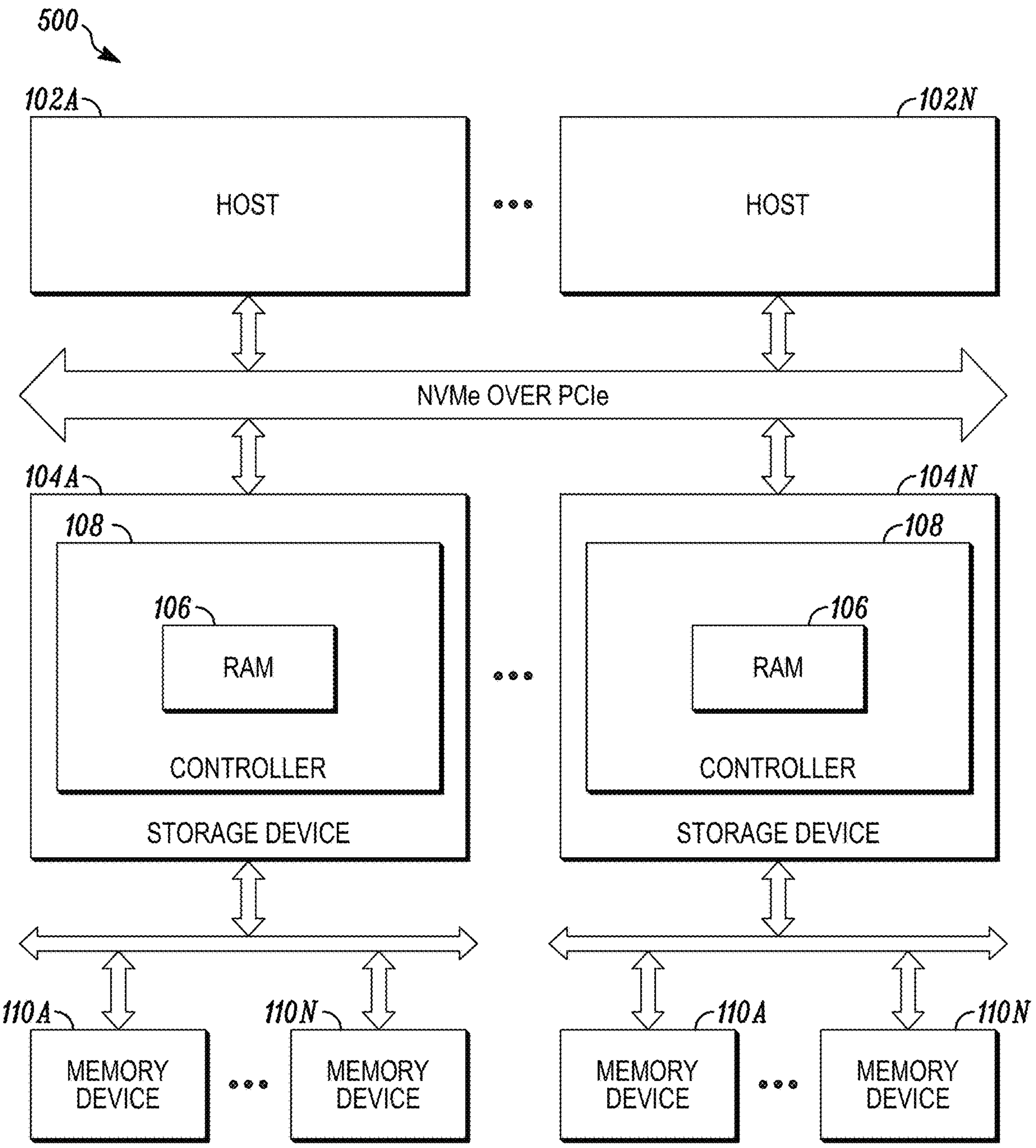
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Storage device 104 may provide host 102 an option to trigger cleanup of a burst pool on memory device 110. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric(NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
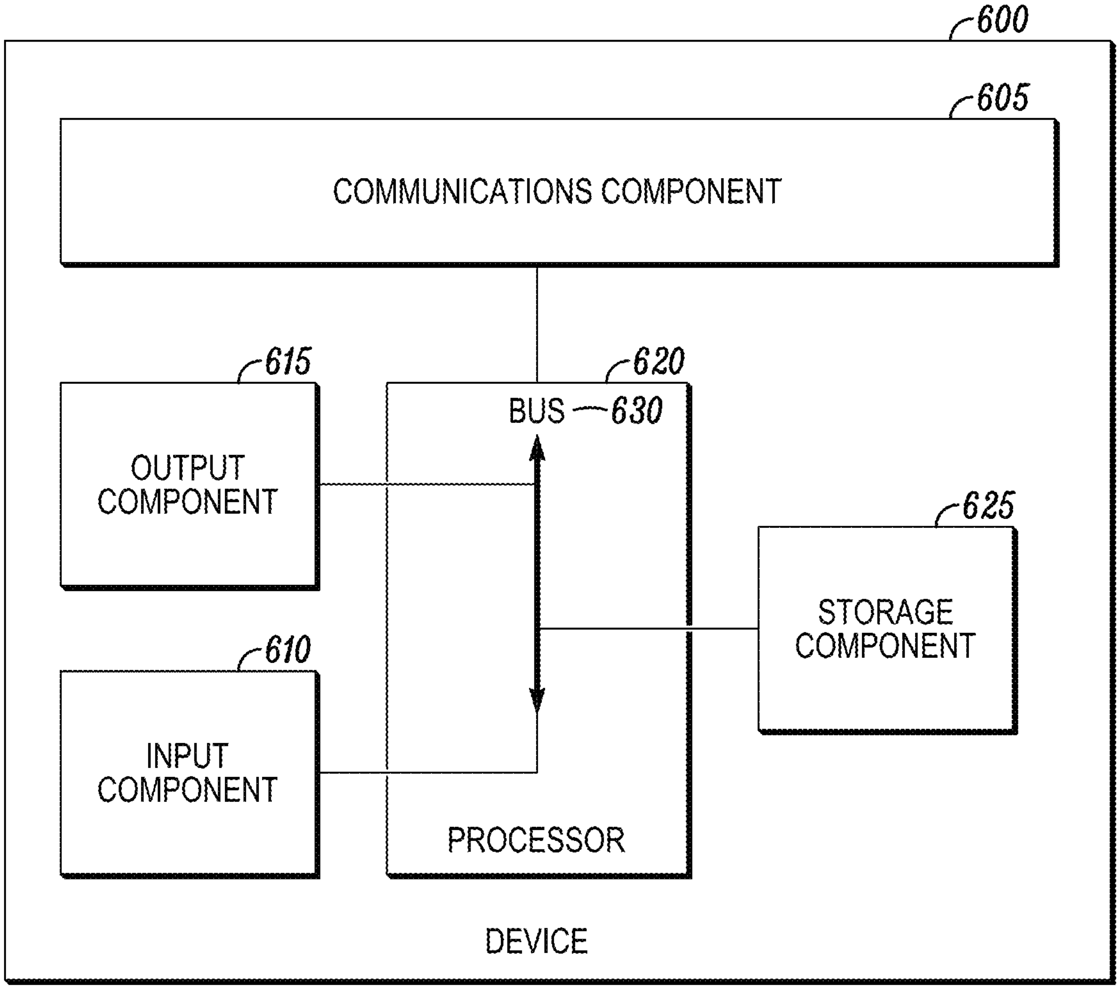
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to ensure burst pool performance for subsequent host data operations after data is written to a burst pool, the storage device comprises:

a memory device including the burst pool and non-burst pool, wherein the burst pool stores fewer bits per memory cell than the non-burst pool; and a controller to receive a burst pool indication from a host, receive a host data operation command from the host, write host data in the burst pool, extend an idle timer that is triggered after a host data operation is complete in response to receipt of the burst pool indication, and relocate data from the burst pool to the non-burst pool during an extended idle time, wherein relocation clears the burst pool.

2. The storage device of claim 1, wherein the controller calculates a time to relocate data currently in the burst pool.

3. The storage device of claim 1, wherein the idle timer is extended to cover a time needed to relocate data currently in the burst pool.

4. The storage device of claim 1, wherein the idle timer is associated with a period after the controller completes the host data operation before entering a low power mode.

5. The storage device of claim 1, wherein the storage device notifies the host when the burst pool has been cleared.

6. The storage device of claim 1, wherein the storage device enters a low power mode when the idle timer expires.

7. A storage device to ensure burst pool performance for subsequent host data operations after data is written to a burst pool, the storage device comprises:

a memory device including the burst pool and non-burst pool, wherein the burst pool stores fewer bits per memory cell than the non-burst pool; and a controller to receive a host data operation command from a host and write host data in the burst pool, prompt the host for a burst pool indication, receive the burst pool indication from the host, extend an idle timer that is triggered after a host data operation is complete in response to receipt of the burst pool indication, and relocate data from the burst pool to the non-burst pool during an extended idle time, wherein relocation clears the burst pool.

8. The storage device of claim 7, wherein the controller calculates a time to relocate data currently in the burst pool.

9. The storage device of claim 7, wherein the idle timer is extended to cover a time needed to relocate data currently in the burst pool.

10. The storage device of claim 7, wherein the idle timer is associated with a period after the controller completes the host data operation before entering a low power mode.

11. The storage device of claim 7, wherein the storage device notifies the host when the burst pool has been cleared.

12. The storage device of claim 7, wherein the storage device enters a low power mode when the idle timer expires.

13. The storage device of claim 7, wherein the storage device uses an Asynchronous Event Notification (AEN) to prompt the host for the burst pool indication.

14. The storage device of claim 13, wherein the AEN includes a calculated time to relocate data currently in the burst pool.

15. A method in a storage device for ensuring burst pool performance for subsequent host data operations after data is written to a burst pool, the storage device comprises a controller to execute the method comprising:

receiving a host data operation command from a host;

writing host data in the burst pool;

receiving a burst pool indication from the host;

extending an idle timer that is triggered after a host data operation is complete in response to receipt of the burst pool indication; and relocating data from the burst pool to a non-burst pool during an extended idle time, wherein relocation clears the burst pool.

16. The method of claim 15, further comprising prompting the host for a burst pool indication.

17. The method of claim 15, further comprising calculating a time to relocate data currently in the burst pool and extending the idle timer to cover the time needed to relocate data currently in the burst pool.

18. The method of claim 15, further comprising notifying the host when the burst pool has been cleared.

19. The method of claim 15, further comprising entering a low power mode when the idle timer expires.

20. The method of claim 15, further comprising using an Asynchronous Event Notification (AEN) to prompt the host for the burst pool indication, wherein the AEN includes a calculated time to relocate data currently in the burst pool.

* * * * *